United States Patent [19]

Shibafuchi et al.

[11] Patent Number: 5,017,355

[45] Date of Patent: May 21, 1991

[54] PROCESS FOR PRODUCING CYANAMIDE

[75] Inventors: Hiroshi Shibafuchi, Hiratsuka; Masanori Sasaki, Tokyo; Hidenori Nitta; Masahiko Yoshida, both of Hiratsuka, all of Japan

[73] Assignee: Nippon Carbide Kogyo Kabushiki Kaisha, Tokyo, Japan

[21] Appl. No.: 581,131

[22] Filed: Sep. 10, 1990

Related U.S. Application Data

[63] Continuation of Ser. No. 352,339, May 16, 1989, abandoned.

[30] Foreign Application Priority Data

May 18, 1988 [JP] Japan .................................. 63-119176

[51] Int. Cl.$^5$ ................................................ C01C 3/16
[52] U.S. Cl. .................................................... 423/369
[58] Field of Search .......................................... 423/369

[56] References Cited

U.S. PATENT DOCUMENTS

| 1,380,223 | 5/1921 | Lidholm | 423/369 |
| 1,444,255 | 2/1923 | Lidholm | 423/369 |
| 1,835,070 | 12/1931 | Mansfield | 423/369 |
| 2,416,545 | 2/1977 | Osborne . | |

FOREIGN PATENT DOCUMENTS

| 449107 | 6/1948 | Canada | 423/369 |
| 503649 | 6/1954 | Canada | 423/369 |
| 186020 | 9/1922 | United Kingdom . | |
| 636600 | 5/1950 | United Kingdom . | |
| 883319 | 11/1961 | United Kingdom . | |

Primary Examiner—Wayne A. Langel
Attorney, Agent, or Firm—Sherman and Shalloway

[57] ABSTRACT

A process for producing cyanamide from lime nitrogen, which comprises dispersing lime nitrogen in an organic liquid containing an aliphatic alcohol having 1 to 3 carbon atoms, and blowing carbon dioxide gas into the dispersion.

3 Claims, No Drawings

PROCESS FOR PRODUCING CYANAMIDE

This application is a continuation of application Ser. No. 352,339, filed May 16, 1989, now abandoned.

FIELD OF THE INVENTION

This invention relates to a novel process for producing cyanamide which is useful as an intermediate for pharmaceuticals, agricultural chemicals and industrial chemicals.

DESCRIPTION OF THE PRIOR ART

Various methods have been proposed for the production of cyanamide from lime nitrogen. For example, "Inorganic Syntheses III", pages 39-43 discloses a process comprising dispersing lime nitrogen in an aqueous medium and adding sulfuric acid to the dispersion. "Chimie & Industrie", 58, pages 545-547 (1947) discloses a method which comprises dispersing lime nitrogen in an aqueous medium, adding hydrochloric acid or nitric acid to the dispersion, and extracting the resulting cyanamide with a water-immisicible solvent such as ethyl acetate.

"J. Chem. Soc.", 1958, page 2903 discloses a process for producing cyanamide which comprises dispersing lime nitrogen in a two-phase solvent system of water and ether, dissolving the resulting cyanamide in the ether phase.

The prior processes for production of cyanamide exemplified above essentially require the presence of water.

Industrially, a process comprising reacting a slurry of lime nitrogen in water with carbon dioxide gas is known. In this process, lime nitrogen reacts with water as shown by the reaction equation (1).

$$2CaCN_2 + 2H_2O \rightarrow Ca(HNCN)_2 + Ca(OH)_2 \quad (1)$$

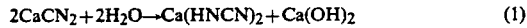

The resulting $Ca(HNCN)_2$ or $Ca(OH)_2$ is considered to react with carbon dioxide gas as in (2) and (3).

$$Ca(OH)_2 + CO_2 \rightarrow H_2O + CaCO_3 \quad (2)$$

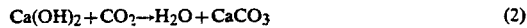

$$Ca(HNCN)_2 + CO_2 + H_2O \rightarrow 2H_2NCN + CaCO_3 \quad (3)$$

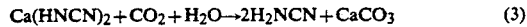

From overall consideration of the reaction equations (1) to (3), the above reaction can be considered to follow the following equation (4).

$$CaCN_2 + CO_2 + H_2O \rightarrow H_2NCN + CaCO_3 \quad (4)$$

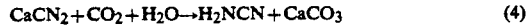

As is clear from the above reaction equation, in a method of producing cyanamide by dispersing lime nitrogen in water, the reaction is generally carried out in an alkaline aqueous medium. Hence, cyanamide tends to be dimerized to form dicyandiamide as a by-product. It is generally difficult to separate cyanamide from the by-product dicyandiamide, and cyanamide obtained by the above-mentioned method involving the use of an aqueous medium as a dispersion medium cannot avoid inclusion of by-product dicyandiamide. It is very difficult to produce cyanamide of a high purity of, example, more than 92% on an industrial scale.

SUMMARY OF THE INVENTION

It is an object of this invention to remove the various defects of the prior art described above, and to provide a novel industrial process for producing high-purity cyanamide from lime nitrogen in a high yield.

The present invention provides a process for producing cyanamide from lime nitrogen, which comprises dispersing lime nitrogen in an organic liquid containing an aliphatic alcohol having 1 to 3 carbon atoms, and blowing carbon dioxide gas into the resulting dispersion.

DETAILED DESCRIPTION OF THE INVENTION

The starting lime nitrogen in this invention is produced industrially by nitrifying calcium carbide in a nitrification furnace. Lime nitrogen contains impurities formed at the time of nitrification such as graphitic carbon and quick lime in addition to calcium cyanamide. Generally, commercial lime nitrogen contains 20 to 27% by weight of nitrogen and contains 19 to 26% by weight of nitrogen in the form of cyanamide. Prior to use, lime nitrogen is pulverized, as required, to adjust its particle size such that at least 50% by weight of its particles pass through a 200-mesh Tyler standard sieve.

According to this invention, lime nitrogen is dispersed in an organic liquid containing an aliphatic alcohol having 1 to 3 carbon atoms, preferably 1 to 2 carbon atoms, most preferably 1 carbon atom, and carbon dioxide gas is blown into the dispersion. This enables cyanamide of high purity to be produced from lime nitrogen in a high yield by a simple process.

Examples of the aliphatic alcohol having 1 to 3 carbon atoms include monohydric alcohols such as methanol, ethanol, isopropanol and n-propanol and polyhydric alcohols such as ethylene glycol, propylene glycol, and glycerol. In the process of this invention, a mixture of two or more aliphatic alcohols may also be used.

Methanol and ethylene glycol are preferred among the aliphatic $C_1$-$C_3$ alcohols, and methanol is especially preferred.

The organic liquid contains the aliphatic $C_1$-$C_3$ alcohols. The organic liquid may be composed solely of the aliphatic $C_1$-$C_3$ alcohol. If desired, it may contain another organic solvent if it does not reduce the purity and yield of the desired cyanamide.

Examples of the other organic solvent are acetonitrile, dimethylformamide, ethyl acetate, acetone and tetrahydrofurane.

In the present invention, the concentration of lime nitrogen in the organic liquid as a dispersion medium at the time of feeding is preferably 5 to 25% by weight, more preferably 15 to 20% by weight.

In the process for producing cyanamide in accordance with this invention, by blowing carbon dioxide gas into the dispersion of lime nitrogen, cyanamide forms as a solution of cyanamide in the organic liquid. Carbon dioxide gas used in this invention is not necessarily of high purity, and may be properly diluted with a gas inert to the reaction system such as nitrogen, oxygen or air. If, however, the concentration of carbon dioxide gas in the resulting gaseous mixture is too low, the aliphatic alcohol is likely to be entrained in the gas and lost. Accordingly, it is preferred that the concentration of carbon dioxide gas in the gaseous mixture be generally at least 20% by volume, especially at least 40% by volume. The water content of the gaseous mixture is not more than 20% by weight, preferably not more than 2% by weight, especially not more than 0.2% by weight.

The reaction by the blowing of carbon dioxide gas is carried out at a temperature of 0° to 40° C., preferably 0° to 30° C., under a pressure of from 0 to 10 kg/cm², preferably under atmospheric pressure. At temperatures higher than 40° C., the purity of the resulting cyanamide tends to decrease, and temperatures below 0° C. do not offer any particular advantage.

After the reaction by the blowing of carbon dioxide gas is over, the reaction dispersion as a slurry is filtered in a customary manner, and a solution of cyanamide in the organic liquid can be easily obtained.

The water content of the reaction system (the content of water in the organic liquid as the dispersion medium) in the process of this invention is generally not more than 20% by weight, preferably not more than 5% by weight, more preferably not more than 3.5% by weight, much more preferably not more than 2.5% by weight, most preferably not more than 1% by weight. As the water content of the reaction system decreases to 20% by weight or below, the reaction dispersion after the reaction does not easily undergo gellation (gellation makes the dispersion infiltrable), and the formation of dicyandiamide by dimerization of cyanamide is inhibited.

In the present specification, the water content of the reaction system denotes the water content at the end of the reaction with carbon dioxide gas. It is measured by the following method. The reaction dispersion taken from the reaction system is centrifuged and filtered to remove materials insoluble in the organic liquid. The filtrate (the organic liquid solution) is analyzed by gas chromatography to be sometimes abbreviated as GC analysis (TCD method) to measure the water content of the filtrate. This water content is defined as the water content of the reaction system.

It is not clear what chemical reactions occur in the novel process of this invention for producing cyanamide from lime nitrogen.

In the case of using methanol as the aliphatic alcohol, when water is added to the methanol-insoluble matter, which is a filtration residue occurring at the time of obtaining a cyanamide solution from the slurry-like reaction dispersion, and the mixture is stirred, the evolution of carbon dioxide gas and the formation of methanol and calcium carbonate are confirmed. Furthermore, as shown in Example 1 given hereinafter, analysis of the methanol-insoluble matter shows that it contains about 1.7 moles of carbonate radicals per mole of Ca in it and that addition of water to it results in the formation of 1.7 moles of methanol. From these facts, the methanol-insoluble matter is considered to contain as main components graphitic carbon in lime nitrogen and a compound of the following formula [A]

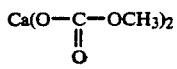  [A]

(see French Patent No. 1,513,416).

For the foregoing reason, it is presumed that in Example 1 of this invention, calcium cyanamide in lime nitrogen, methanol and carbon dioxide gas reacted to form cyanamide and the compound of formula [A].

In the process of this invention, cyanamide is obtained as a solution in the organic liquid. The cyanamide solution may be stabilized by adding an acid as required because it may undergo gellation during storage. The acid used for stabilization may be an inorganic acid such as phosphoric acid, sulfuric acid, nitric acid or hydrochloric acid, an organic acid such as acetic acid or oxalic acid, or a cationic exchange resin such as a sulfonic acid-type cation exchange resin. Among them, phosphoric acid is especially preferred.

The amount of the acid to be added to the cyanamide solution is preferably about 1 equivalent per equivalent of Ca of the calcium compound dissolved in a trace amount in the solution.

As required, the cyanamide solution is concentrated, preferably under reduced pressure, to remove the organic liquid, and crystalline cyanamide of high purity can be easily obtained.

Since according to this invention, the formation of by-product dicyandiamide is very effectively inhibited, a solution or crystals of cyanamide having a purity of as high as, for example 96% can be obtained in a high yield by an industrially simplified method.

The following Examples illustrate the present invention more specifically.

EXAMPLE 1

A 500-liter stainless steel reactor equipped with a cooling jacket and a reflux condenser was charged with 375 liters (297 kg) of methanol (purity 99.5% by weight, water content 0.5% by weight) and 63 kg of lime nitrogen (nitrogen content 24.6% by weight; nitrogen content as calcium cyanamide 23.6%, particle size, 65% by weight of particles which passed through a 200-mesh sieve), and they were dispersed by stirring to form a slurry. Then, with stirring, 62.1 kg of carbon dioxide gas (purity 99.99% by weight) was introduced into the slurry over about 8 hours while the slurry was maintained at a temperature of about 15° C. After the reaction, materials insoluble in methanol were separated by a centrifugal separation and filtration machine. The resulting filtrate (methanol solution) had a water content of 1.8% by weight when it was determined by GC analysis (TCD method). The material insoluble in methanol was washed with 63 liters (50 kg) of the same methanol as used in the reaction. The washing was combined with the filtrate to give 290 kg in total of a methanol solution of cyanamide. The contents of cyanamide and by-product dicyandiamide in the methanol solution, determined by liquid chromatography (to be sometimes abbreviated as LC), were 6.9% by weight and 0.02% by weight, respectively. The yield of cyanamide based on the calcium cyanamide in the starting lime nitrogen was 90%, and the ratio of formation of dicyandiamide was 0.3%.

3.3 kg of 85% by weight phosphoric acid was added to the methanol solution, and the mixture was stirred. The resulting insoluble matter was separated by filtration. The resulting methanol solution was stable without gelation after the lapse of 1 month.

A portion of the methanol solution before addition of phosphoric acid was taken and allowed to stand in a sealed condition. Seven days later, the entire solution became an agar-like gel.

Part of the methanol-insoluble matter was dried under reduced pressure, and about 1 g of the dried matter was precisely weighed and put in a flask equipped with a reflux condenser. Ten grams of deionized water was added, and the mixture was stirred at room temperature for about 3 hours. The insoluble matter was separated by filtration, and the resulting filtrate was analyzed by gas chromatography. The amount of methanol determined was about 8.5 millimoles/g.

Separately, about 1 g of the same dried methanol-insoluble matter was precisely weighed and put in a Kjeldahl flask. Fifty cc of 1N hydrochloric acid was added, and the flask was heated gently to about 100° C. The gas which evolved was introduced into a saturated aqueous solution of barium hydroxide, by quantitatively determining the precipitated barium carbonate, the amount of carbonate radicals was found to be about 8.6 millimoles/g. The contents of the Kjeldahl flask were filtered, and the filtrate was diluted with deionized water to a volume of 250 cc. Ten cc of it was used, and analyzed for calcium using a BT reagent as an indicator and ethylenediaminetetraacetic acid. The amount of calcium was about 5.0 millimoles/g.

From the above results, it is seen that about 1.7 moles of methanol and about 1.7 moles of carbonate radicals per mole of calcium were detected from the methanol-insoluble matter.

EXAMPLE 2

A 20-liter glass reactor equipped with a stirring device and a reflux condenser was charged with 10 liters (7.93 kg) of methanol (purity 98.3% by weight, water content 1.7% by weight) and 2 kg of lime nitrogen same as in Example 1. They were stirred to form a slurry. The slurry was cooled by an ice bath from an external source. While maintaining a temperature of about 20° C., 1.98 kg of the same carbon dioxide gas as used in Example 1 was introduced over the course of 8 hours and reacted. After the reaction, materials insoluble in methanol were separated by centrifugal separation and filtration machine. The water content of the filtrate, measured as in Example 1, was 3.3% by weight. The insoluble materials were further washed with 2 liters of methanol (1.586 kg; purity 99.5% by weight). The washing was combined with the filtrate, and 129 g of 85% by weight phosphoric acid was added. The mixture was stirred. The resulting insoluble matter was separated by filtration to obtain 9.40 kg of a stabilized methanol solution of cyanamide. The amounts of cyanamide and by-product dicyandiamide contained in the methanol solution, by the same LC analysis as in Example 1, were 6.8% by weight, and 0.02% by weight. The yields of these products based on calcium cyanamide in the starting lime nitrogen were 90% and 0.3%, respectively.

A portion of the methanol solution before addition of phosphoric acid was taken, and left to stand in a sealed condition. Twenty-four hours later, the entire solution became an agar-like gel. The methanol solution stabilized by addition of phosphoric acid remained stable without gellation even after the lapse of 1 month as in Example 1.

The methanol solution of cyanamide to which phosphoric acid was added was concentrated under reduced pressure (20 torr) at a temperature of 30° C. or less by means of a large-sized evaporator, and further dried to give 0 637 kg of white crystals.

The results of analyzing the white crystals were as follows:
Purity: 99.2% by weight
Dicyandiamide: 0.4% by weight
Urea 0.01% by weight
Water: 0.3% by weight

EXAMPLE 3

The same reaction as in Example 2 was carried out except that the reaction temperature was adjusted to about 10° C., and the purity of methanol used was changed to 96.3% by weight (water content 3.7% by weight). After the reaction, the methanol-insoluble matter was separated by filtration as in Example 1. By the same measurement as in Example 1, the water content of the filtrate was 4.3% by weight.

Thereafter as in Example 2, the insoluble matter was washed with methanol, and the washing was combined with the filtrate, and 85% by weight phosphoric acid was added to this solution. The mixture was stirred, and the resulting insoluble matter was separated by filtration to give 9.40 kg of a methanol solution of cyanamide.

The amounts of cyanamide and by-product dicyandiamide in the methanol solution, determined by the same LC analysis as in Example 1, were 6.8% by weight and 0.03% by weight, and the yields of these based on calcium cyanamide in the starting lime nitrogen were 90% and 0.4%, respectively.

Part of the methanol solution before addition of phosphoric acid was taken, and left to stand in a sealed condition. Four hours later, the entire solution became an agar-like gel. The methanol solution to which phosphoric acid had been added remained stable without gellation even after the lapse of 1 month as in Example 1.

The methanol solution was then concentrated to dryness by using the same apparatus and under the same conditions as in Example 2 to give 0.640 kg of cyanamide crystals. Analysis showed the following results.
Purity: 98.6% by weight
Dicyandiamide: 0.8% by weight
Urea: 0.1% by weight
Water content: 0.4% by weight

COMPARATIVE EXAMPLE

Water (150 liters) was fed into the same reactor as used in Example 1, and with stirring, the same carbon dioxide gas as used in Example 1 was introduced. While the reaction temperature was maintained at 15° C. and the pH was adjusted to below 7.5, 63 kg of the same lime nitrogen as used in the above Examples was added little by little. The addition of lime nitrogen ended in 7 hours. Then, the mixture was maintained as such for 1 hour, and the introduction of carbon dioxide gas was stopped. The reaction dispersion was centrifuged. The insoluble matter was washed with about 30 liters of water, and combined with the filtrate. There was obtained 164.3 kg of an aqueous solution of cyanamide. The cyanamide content was 10.8% by weight, and the content of by-product dicyandiamide was 0.74% by weight. The yields of cyanamide and dicyandiamide based on calcium cyanamide in the starting lime nitrogen were 80% and 5%, respectively.

We claim:
1. A process for producing cyanamide from lime nitrogen, which comprises dispersing lime nitrogen in an organic liquid containing methanol and blowing carbon dioxide gas into the resulting dispersion to react lime nitrogen, methanol and carbon dioxide under conditions such that the water content of the reaction system is not more than 5% by weight.

2. The process of claim 1 in which the water content of the reaction system is not more than 3.5% by weight.

3. The process of claim 1 in which the water content of the reaction system is not more than 2.5% by weight.

* * * * *